United States Patent [19]
O'Brill

[11] 4,172,063
[45] Oct. 23, 1979

[54] ABRASION RESISTANT REFLECTIVE MARKING COMPOSITION

[76] Inventor: Robert O'Brill, 8116 Lorel, Skokie, Ill. 60076

[21] Appl. No.: 747,843

[22] Filed: Dec. 6, 1976

[51] Int. Cl.² .............................................. C08L 61/06
[52] U.S. Cl. ........................... 260/29.6 S; 260/37 EP; 260/42.13
[58] Field of Search ............ 260/37 EP, 42.13, 42.18, 260/29.6 S; 252/301.35; 404/14, 12

[56] References Cited

U.S. PATENT DOCUMENTS

| | | | |
|---|---|---|---|
| 2,952,192 | 9/1960 | Nagin | 260/37 EP |
| 2,983,202 | 5/1961 | Wynn | 260/40 R |
| 3,030,870 | 4/1962 | Gill | 252/301.35 |
| 3,046,851 | 7/1962 | de Vries | 260/40 |
| 3,105,771 | 10/1963 | Simpson et al. | 260/37 EP |
| 3,418,896 | 12/1968 | Rideout | 404/14 |
| 3,538,036 | 11/1970 | Peters et al. | 260/42.13 |
| 3,908,055 | 9/1975 | Susuki et al. | 404/12 |
| 3,958,041 | 5/1976 | Wagner et al. | 260/42.18 |
| 3,998,645 | 12/1976 | Okazaki et al. | 404/14 |

FOREIGN PATENT DOCUMENTS 1029512  5/1966  United Kingdom ............ 252/301.3 R

*Primary Examiner*—Lewis T. Jacobs
*Attorney, Agent, or Firm*—Bernard L. Kleinke

[57] ABSTRACT

An abrasion resistant reflective exterior marking composition for application to a cementitious substrate, includes a vehicle component having an organic thermoplastic, resinous, film-forming material adapted to form a tenacious bond with the substrate. The composition includes an inorganic aggregate material including a sand component and a glass fibre strand component, a high visibility fluorescent pigment, and a sufficient quantity of an extender for said vehicle so as to render the composition readily applicable to the substrate by brushing, spraying, troweling or the like.

9 Claims, No Drawings

ABRASION RESISTANT REFLECTIVE MARKING COMPOSITION

The present invention relates to an abrasion resistant reflective marking composition, and it more particularly relates to a marking composition which has high visibility and is abrasion resistant.

Abrasion resistant coatings or paints have been known for many different applications, including road marking. For example, reference may be made to the following U.S. Pat. Nos. 2,184,492; 2,196,890; 2,983,202; 3,005,790; 3,046,851 and 3,418,896. However, none of the coatings disclosed in the foregoing-mentioned patents includes highly visible colors, such as fluorescent colors of paint including daylight fluorescent pigments. Such pigments are disclosed in U.S. Pat. Nos. 2,809,954 and Re. 25,845. Such a highly visible paint would be extremely desirable to have, since a fluorescent paint is highly visible during daytime and glows in a black light at night for safety marking purposes. Thus, it would be highly desirable to have an outdoor abrasion resistant paint, which includes highly visible colors for marking and which can be applied to a cementitious substrate. Such a new abrasion resistant reflective exterior marking paint should be relatively inexpensive to manufacture as compared to conventional fluorescent paint, since conventional fluorescent paint is much too expensive to be used for exterior marking purposes. Such a reflective exterior marking composition should possess long wearing qualities as compared to conventional abrasion resistant coatings.

Therefore, the principal object of the present invention is to provide a new and improved abrasion resistant reflective marking composition, which is relatively inexpensive to manufacture and which produces a highly visible coating for different types and kinds of substrates including cementitious substrates.

Another object of the present invention is to provide such a new and improved abrasion resistant reflective marking composition, which produces a highly abrasion resistant coating and which is extremely long lasting.

Briefly, the above and further objects of the present invention are realized by providing an abrasion resistant reflective exterior marking composition for application to various different types and kinds of substrates, such as cementitious substrates. The composition includes a vehicle component, including an organic thermoplastic, resinous, film-forming material adapted to form a tenacious bond with the substrate. The composition further includes as inorganic aggregate material, including a sand component and a glass fiber strand component, a highly visible, fluorescent pigment and a sufficient quantity of an extender for the vehicle so as to render the composition readily applicable to the substrate by brushing or spraying.

The invention, both as to its organization and method of operation, together with further objects and advantages thereof will best be understood by reference to the following detailed description.

The new abrasion resistant reflective marking composition has many uses. In this regard, it may be used as a paint for marking airport runways, center stripes on highways, curb markings to indicate "no parking" and the like. The new marking composition is highly visible and has good skid-resistance qualities, and therefore it can be used in such places as swimming pool decks, sidewalks (such as outside institutions for elderly or handicapped persons), and the like. It is able to withstand freeze-thaw cycles, and it has good flexural and tensile strength, as well as some improvement in compressive strength. It may be used either indoors or out of doors, and it is able to withstand fading for long periods of time from ultraviolet rays of the sun. The coating of the present invention produces a hard surface which has great wearability and long lasting qualities. The coating of the present invention also has good bonding qualities so that it adheres readily to many different substrates, including cementitious substrates.

The marking composition includes fluorescent pigments to provide a bright highly visible color, and the other materials of the composition enable the overall coating to be much less expensive than conventional fluorescent paints. As a result, the inventive coating composition can be used economically in large quantities, such as in highway marking, without being unduly expensive. In this regard, the wear resistant composition of the present invention may also be used to paint-on outdoor signs. Also, the fluorescent pigments produce a glowing effect at nighttime when illuminated with black light. As a result, the composition produces a night glow effect which is highly desirable for many applications. When used in connection with highways and runways, they can be illuminated with the black light to produce a glowing effect for signaling and warning purposes to promote safety. Similarly, the same marking composition of the present invention is highly visible and reflective during daytime to serve as safety markings as well as being highly visible when used in such applications as paint-on billboards for advertising purposes.

The composition of the present invention may also include glass fibre strand components to provide great tensile strength. As a result, the marking composition including glass fibre strand components can withstand different changes in temperature where the substrate has a much different coefficient of expansion, whereby the composition of the present invention resists cracking and peeling. Thus, the inventive composition may be used on metal substrates such as gutters, soffits and other metallic building trim.

The reflective exterior marking composition of the present invention is abrasion resistant and may be applied to cementitious substrates, such as concrete, asphalt or tar roads, runways, ramps, sidewalks, bridge floors and the like, as well as to metallic and other substrates. The composition includes a vehicle component including an organic thermoplastic, resinous, film-forming material adapted to form a tenacious bond with the substrate. The composition also includes an inorganic aggregate material, preferably including a sand component and a glass fiber strand component. Also included is a high visibility, fluorescent pigment. A sufficient quantity of an extender for the vehicle is added so as to render the composition readily applicable to the substrate by brushing or spraying.

The following examples more fully illustrate the invention, but it is not intended that the invention be limited to the exact procedures or concentrations utilized. Rather, it is intended that all equivalents obvious to those skilled in the art be included within the scope of the invention.

EXAMPLE 1

| | |
|---|---|
| 100 | parts by weight portland cement |
| 200 | parts by weight silica sand (Wedron Silica Division, Del Monte Properties Co., "Wedron") |
| 1 | part by weight alkali resistant glass fibers (Owens Corning) |
| 42 | parts by weight acrylic cement modifier emulsion film-forming bonding agent (Rohm and Haas "Rhoplex E-330" cement mortar modifier) |
| 20 | parts by weight fluorescent pigment (Lawter Chemicals, Inc., "Hi-Viz") |
| 0.25 | part dry water reducing admixture (American Admixture Co. "Melment") |

The portland cement can be of any convenient variety, but white in color cement is preferred, even though grey portland cement is acceptable for some applications where a pale color is desirable. The silica sand is preferably white in color and is in various size gradations from dust to ⅛ inch. The sand adds to wearability of the composition and serves as a filler. It also helps provide a non-slip surface to the coating formed by the composition. The glass fibers and the sand are inorganic aggregate material, and the glass fibers provide impact resistance and help prevent shrinkage.

The bonding agent is an organic thermoplastic, resinous, film-forming material adapted to form a tenacious bond with the substrate to be coated. The bonding agent is water emulsifiable and is clear in color. The bonding agent is a water dispersion of an acrylic polymer and is a liquid having about 47% solid content. It has a pH of 9.5 to 10.0, and a specific gravity of 1.059.

The water reducing admixture is well known to those skilled in the art, and it serves to reduce the water content of the composition, while allowing the cement to hydrate. Thus, the coating has better structural strength and provides for greater workability.

All of the foregoing mentioned ingredients were thoroughly mixed. The resulting mixture was then applied by troweling or rolling to a test slab. After thus applying a coat of the composition, it was permitted to air dry.

This composition was applied in the above manner to the runway of a large metropolitan airport as a marking. The resulting coating was highly visible during daylight and produced a vivid glowing effect at night to provide even greater visibility. By employing the black light effect as the runway marking, the marking was readily distinguishable from other lights, and it could be seen in a clear manner without causing eye strain, which oftentimes occurs when a conventional white light shines on a dark night and provides a piercing blinding contrast with the darkness. Furthermore, this composition provided an abrasion resistant coating that is still functioning extremely well after a long period of time under extraordinarily heavy traffic conditions. Also, the composition was able to be applied and cured by drying in a reasonably short period of time so that the runway was not taken out of service for too long a period of time. Additionally, it is important and desirable to have an abrasion resistant coating which will last for long periods of time before a fresh coating is applied so as to reduce the overall down time of the runways. The composition also exhibited good flexibility and good freeze-thaw stability. The coating was installed and is still functioning well in a climate that experiences temperature ranges of about 100° F. annually.

EXAMPLE 2

This composition is the same as the composition of Example 1, except that the film-forming bonding agent is Rohm and Haas "Rhoplex Mc-76", which is also an acrylic polymer bonding agent in a liquid form, it being 47% solids. It has a pH of 9.5 to 10, and a specific gravity of 1.059. The results of using this formulation are very similar to the results obtained with the composition of Example 1.

EXAMPLE 3

This composition is the same as the composition of Example 1, except that the film-forming bonding agent is a dry bonding agent known as Rohm and Haas "Acryloid Mc-46". This film-forming bonding agent is also an acrylic polymer bonding agent, and the results achieved are also similar to the results achieved with the composition of Example 1. Substituted for the liquid Rhoplex E-330 bonding agent was 43.3 part of water and 6.70 part of Mc-46 bonding agent.

EXAMPLE 4

The present example is the same as Example 1, except that the film-forming bonding agent is a liquid bonding agent known as Dow Chemical "Sarabond", which is a "Saran" polymeric emulsion in the form of a mixture of polyvinyl chloride and polyvinylidene chloride.

EXAMPLE 5

This example is the same as Example 1, except that the film-forming bonding agent is "Dow Chemical 460" which is a 42% solids, organic-polymer latex admixture of a butadiene-styrene type, including air-detraining agents. It is a non-reemulsifiable bonding agent. The results of the use of this composition are similar to the results achieved with the composition of Example 1.

EXAMPLE 6

This example is the same as Example 1, except that the film-forming bonding agent is W. R. Grace "Daraweld-C". This bonding agent is a dispersion of internally plasticized, high polymer resin in water and is a vinyl acetate copolymer having 50 to 52% solids content. The viscosity is only slightly higher than the viscosity of water.

EXAMPLE 7

This example is the same as Example 1, except that the film-forming bonding agent is Sika Chemical "Sikabond Latex". This bonding agent is an organic polymer latex with an acrylic base.

EXAMPLE 8

| | |
|---|---|
| 0.1 | parts by weight of portland cement |
| 250 | parts by weight of sand |
| 100 | parts by weight of a film-forming cement-modified bonding agent ("Acryloid Mc-46") |
| 0.7 | parts by weight of fluorescent pigment |
| 0.1 | parts by weight of glass fiber components |
| 0.1 | parts by weight of water reducing agent (American Admixtures "Melment") |
| 25 | parts by weight of water |

The composition in this example is similar to the Example 1, except that the cement content, pigment content and water content are small in comparison to the corresponding proportions in Example 1. A relatively large amount of sand is employed, and thus the resulting composition has better abrasion resistance and skid (slipping) resistance. The bonding agent is a dry bonding agent.

EXAMPLE 9

This example is the same as Example 8, except that the film-forming bonding agent is the liquid bonding agent "Rhoplex E-330". The amount of the liquid bonding agent is 10.5 parts by weight, and since the liquid bonding agent includes water, 5.6 parts of this composition is water.

EXAMPLE 10

| | |
|---|---|
| 500 | parts by weight of portland cement |
| 0.1 | part by weight sand |
| 50 | parts by weight film-forming bonding agent ("Acryloid Mc-46") |
| 21 | parts by weight of fluorescent pigment |
| 3.6 | parts by weight glass fiber components |
| 15 | parts by weight water reducing agent |
| 180 | parts by weight water |

This formulation includes a high percentage of portland cement which produces a resulting composition of good compressive strength.

EXAMPLE 11

This example is the same as Example 10, except that a liquid film-forming bonding agent ("Rhoplex E-330") is employed. One hundred parts by weight of the liquid bonding agent are employed, and 53 parts by weight of water are used. It should be noted that with this formulation that a small quantity of sand is employed.

EXAMPLE 12

| | |
|---|---|
| 0.1 | parts of portland cement |
| 0.1 | parts by weight of sand |
| 50 | parts by weight of dry film-forming bonding agent ("Acryloid Mc-46") |
| 100 | parts by weight fluorescent pigments |
| 3.6 | parts by weight of glass fiber components |
| 0.1 | parts by weight of water reducing agent |
| 50 | parts by weight of water |

This composition provides for very high visibility due to the high loading of pigments. There is provided a small proportion of sand.

EXAMPLE 13

This example is the same as Example 12, except that 10.5 parts by weight of the liquid film-forming bonding agent "Rhoplex E-330" is employed. Also, no extra water is used, since the water components are included with the liquid bonding agent. In this case, the fluorescent paint pigments would be reduced to 10.5 parts by weight of the entire composition. This composition provides an extremely high visibility coating.

EXAMPLE 14

| | |
|---|---|
| 100 | parts by weight of portland cement |
| 1500 | parts by weight sand |
| 20 | parts by weight dry film-forming bonding agent ("Acryloid Mc-46") |
| 100 | parts by weight fluorescent pigments |
| 1 | part by weight glass fiber components |
| 1 | part by weight water reducing agent |

-continued

| | |
|---|---|
| 50 | parts by weight water |

This composition includes a large quantity of sand to provide good abrasion resistance and skid resistance. It employs a dry film-forming bonding agent.

EXAMPLE 15

This example is the same as Example 14, except that 20 parts by weight of a liquid film-forming bonding agent "Rhoplex E-330" is employed, and 10.6 parts by weight of water are employed.

EXAMPLE 16

| | |
|---|---|
| 56 | parts by weight of portland cement |
| 2 | parts by weight sand |
| 5 | parts by weight dry film-forming bonding agent ("Acryloid Mc-46") |
| 4 | parts by weight fluorescent pigments |
| 1 | part by weight glass fiber components |
| 0.5 | part by weight water reducing agent |
| 25 | parts by weight water |

This formulation includes a very low amount of dry film-forming bonding agent, and yet it produces a desirable coating.

EXAMPLE 17

| | |
|---|---|
| 100 | parts by weight portland cement |
| 250 | parts by weight sand |
| 100 | parts by weight dry film-forming bonding agent ("Acryloid Mc-46") |
| 100 | parts by weight fluorescent pigments |
| 1 | part by weight glass fiber components |
| 1 | part by weight water reducing agent |
| 200 | parts by weight water |

This example uses a very high proportion of dry film-forming bonding agent and a very high proportion of water. The resulting coating has very satisfactory qualities.

EXAMPLE 18

This example is the same as Example 17, except that a liquid film-forming bonding agent "Rhoplex E-330" is employed, and 1.5 parts by weight of that liquid bonding agent are used. Also, 25 parts by weight of fluorescent pigments are used. Also, 29 parts by weight of water are used. This composition uses a relatively small amount of liquid bonding agent to produce a satisfactory coating.

EXAMPLE 19

This example is the same as Example 18, except that 20 parts by weight of the liquid film-forming bonding agent "Rhoplex E-330" is employed, and 15 parts by weight of water are used. This composition employs a very high proportion of liquid bonding agent to produce a highly satisfactory coating.

EXAMPLE 20

| | |
|---|---|
| 100 | parts by weight of portland cement |
| 300 | parts by weight sand |
| 60 | parts by weight liquid film-forming bonding agent ("Rhoplex E-330") |
| 25 | parts by weight fluorescent pigments |

| | |
|---|---|
| 1 | part by weight glass fiber components |
| 1 | part by weight water reducing agent |
| 0.75 | parts by weight water |

This composition employs a very small proportion of water, and produces a very satisfactory coating.

EXAMPLE 21

| | |
|---|---|
| 50 | parts by weight of portland cement |
| 150 | parts by weight sand |
| 5 | parts by weight dry film-forming bonding agent ("Acryloid Mc-46") |
| 25 | parts by weight fluorescent pigments |
| 109 | parts by weight glass fiber components |
| 1.0 | parts by weight water reducing agent |
| 5.5 | parts by weight water |

This composition uses a very high proportion of glass fiber components to add strength, flexibility and workability of the composition, and it also reduces shrinkage.

EXAMPLE 22

This example is the same of Example 20, except that 5 parts by weight of cement of a liquid film-forming bonding agent "Rhoplex E-330" is employed, and 22 parts by weight of water are used. The resulting composition is highly satisfactory, and once again used a high content of fiberglass fibers.

The foregoing Examples 8 through 22 are various different examples of high and low ranges of proportions of the different components of the composition of the present invention. The following is a Table 1 which shows the acceptable ranges for each of the ingredients.

Table 1

| Material | Parts by Weight |
|---|---|
| portland cement | 0.1–500 |
| sand | 0.1–1500 |
| fluorescent pigments | at least 0.10 |
| liquid bonding agent | 0.02–300.0 |
| dry bonding agent | 0.01–150.00 |
| glass fiber components | 0.1–50.0 |
| water reducing agent | 0.03–10.0 |
| water | 0.04–200.0 |

EXAMPLE 23

| | |
|---|---|
| 1 | part by weight fluorescent pigments (red) |
| 1 | part by weight liquid film-forming bonding agent (Rohm and Haas "Rhoplex E-330") |
| 2 | parts by weight Wedron silica sand |

After being mixed, the composition was easily pourable and somewhat self-leveling. When exposed to black light, the resulting coating provided a high brilliant glowing effect.

EXAMPLE 24

| | |
|---|---|
| 2 | parts portland cement |
| 1 | part by weight fluorescent pigments (red) |
| 1 | part by weight liquid film-forming bonding agent (Rohm and Haas "Rhoplex E-330") |

The composition was very dry, and with the addition of white portland cement the color was changed from a dark red to a blushing pink. The resulting coating was very hard and durable.

EXAMPLE 25

This example is the same as Example 24, except that 1 part by weight water reducing agent (liquid form) is added. The dry mixture became extremely wet when mixed with the 1 part of water reducing agent. The resulting coating was very satisfactory.

EXAMPLE 26

This example is the same as Example 25, except that 4 parts by weight Wedron silica sand are added. The sand mixed readily with the ingredients and was easily pourable.

EXAMPLE 27

This composition is the same as the composition of Example 26, except that 4 parts by weight Owens Corning glass fibers are included. The silica sand settled to the bottom of the mixing container and there appeared to be an overabundance of fiberglass fibers.

EXAMPLE 28

| | |
|---|---|
| 256 | parts by weight white portland cement |
| 512 | parts by weight silica sand (white) |
| 16 | parts by weight fluorescent pigments (blue) |
| 32 | parts by weight film-forming bonding agent (Rohm and Haas "Acryloid E-330") |
| 2 | parts by weight accelerator admix |
| 1 | part by weight water reducing agent |
| 112 | parts by weight water |

The composition set up rapidly and with the addition of the bonding agent the composition was sticky. A reduction of the amount of the bonding agent is desirable to reduce or eliminate the stickiness for some applications requiring a less sticky or more smooth consistency.

EXAMPLE 29

| | |
|---|---|
| 256 | parts by weight white portland cement |
| 256 | parts by weight bank sand |
| 256 | parts by weight white silica sand |
| 16 | parts by weight fluorescent pigments (green) |
| 24 | parts by weight film-forming bonding agent (Rohm and Haas "Acryloid Mc-46") |
| 1.2 | parts sodium citrate |
| 2 | parts by weight accelerator admix |
| 1 | part by weight water reducing agent |
| 128 | parts by weight water |
| 2.7 | parts by weight fiber glass fibers |

The composition set up rapidly indicating that the accelerator may not be required for some applications, although for certain applications rapid set up is desirable. Fluorescent color did not appear to be noticeably diminished. The less expensive bank sand was employed to serve as a filler without substantially diminishing the qualities of the overall composition. Two types of sand were used to form a strong bond, since the smaller mesh silica sand fills the voids between the large sand particles. Overall, the resulting composition exhibited excellent properties and was highly satisfactory.

EXAMPLE 30

| 16 | parts by weight portland cement |
|---|---|
| 32 | parts by weight silica sand |
| 1 | part by weight Titanium dioxide |
| 1 | part by weight fluorescent pigments (blue) |
| | Mixed with a sufficient amount of liquid film-forming bonding agent to make mixture workable. |

The composition mixed very well and trowelled easily. The color was a lighter blue than the color blue of the pigments, but not lighter than the color when the fluorescent pigments are diminished in proportion.

EXAMPLE 31

| 24 | parts by weight methyl methacrylate (Rohm and Haas "Acryloid B66") |
|---|---|
| 1 | part by weight fluorescent pigments |
| 4 | parts by weight silica sand (50/25) |
| 320 | parts by weight silica sand (30/40) |

The fluorescent glowing effect of the composition was acceptable under black light, and trowelled in an acceptable manner. This composition can be diluted with an additional bonding agent to make it less viscous. The bonding agent used in this example is a polymeric acrylic-type ester 40% solids solution in toluol. It has a viscosity at 25° C. of 235 to 325 centipoises.

EXAMPLE 32

| 16 | parts by weight clear polyurethane |
|---|---|
| 1 | part by weight fluorescent pigments |
| 128 | parts by weight silica sand (30/40) |

The fluorescent properties were very good. The workability of the composition was good using a trowel. Workability was still quite good after 15 minutes and was slow drying.

EXAMPLE 33

| 24 | parts by weight white portland cement |
|---|---|
| 48 | parts by weight silica sand |
| 1 | part by weight fluorescent pigments (blue) |
| 10.5 | parts by weight latex film-forming bonding agent (Sika Chemical "Sika Latex") |

The fluorescent properties were acceptable. The workability was very good and the compound was slow drying. The latex bonding agent is a 42% solids, organic-polymer latex admixture of a butadiene-styrene type, including air-detraining agents. It is a non-reemulsifiable bonding agent.

EXAMPLE 34

| 30 | parts by weight portland cement |
|---|---|
| 90 | parts by weight silica sand |
| 1 | part by weight fluorescent pigments |
| 6 | parts by weight latex film-forming bonding agent (W.R. Grace Co. "Daraweld-C") |

The fluorescent properties were acceptable and the workability good.

EXAMPLE 35

| 100 | parts by weight portland cement |
|---|---|
| 300 | parts by weight sand |
| 12 | parts by weight film-forming weld-crete bonding agent ("Weld-Crete") |
| 4 | parts by weight fluorescent pigments |
| | sufficient water to provide desired consistency |

The fluorescent properties of the resulting coating were acceptable. Workability of the mixture was good, being very similar to Example 34, except sticky and somewhat more difficult to trowel.

EXAMPLE 36

| 10 | parts by weight silica sand |
|---|---|
| 3 | parts by weight film-forming bonding agent (Rohm and Haas "Acryloid B-66") |
| 1 | part by weight fluorescent pigments |

The bonding agent is methyl-butyl methacrylate copolymer. The resulting mixture of this example contained poor spreading characteristics but had a good dark color. The solvent odor was noticeable, but not undesirable for some applications.

EXAMPLE 37

| 4 | parts by weight silica sand |
|---|---|
| 2 | parts by weight portland cement |
| 1 | part by weight fluorescent pigments |
| | sufficient acrylic film-forming bonding agent (Rohm and Haas "Rhoplex MC76") to wet material |

The bonding agent is a water dispersion of an acrylic polymer. The color of the cured composition was excellent, and the mixture had good workability during application thereof.

What is claimed is:

1. An abrasive resistant, reflective exterior marking composition useful for application to a substrate, such as a cementitious substrate, said composition comprising, in combination, a vehicle component including an organic thermoplastic, resinous, film-forming material in an amount sufficient to form a tenacious bond with said substrate, a high visibility, fluorescent pigment in an amount sufficient to produce fluorescence, a sufficient quantity of an extender for said vehicle so as to render said composition readily applicable to said substrate by brushing or spraying or troweling, and the remainder being an inorganic aggregate material including a sand component, hydraulic cement in a cementitious amount and a glass fiber strand component, wherein said hydraulic cement is Portland cement in the amount of about 0.1–500 parts by weight, said sand component is sand in the amount of about 0.1–1500 parts by weight, said fluorescent pigment is in at least about 0.10 parts by weight, said film-forming material is in the amount of about 0.01–300.0 parts by weight, said glass fiber strand component is in the amount of about 0.1–50.0 parts by weight, and said extender includes a water-reducing agent in the amount of about 0.03–10.0 parts by weight and water in the amount of about 0.04–200.0 parts by weight.

2. A composition according to claim 1, wherein said film-forming material is a polymer selected from the class consisting of acrylic polymers, butadiene-styrene polymers, polyvinyl acetate polymers, polyvinyl chloride polymers and polyvinylidene chloride polymers.

3. A composition according to claim 2, wherein said film-forming material is an acrylic polymer from the class consisting of methyl methacrylate polymers, butyl acrylate polymers and copolymers thereof.

4. A composition according to claim 1 wherein said film-forming material is a polymer selected from the class consisting of acrylic polymers, butadiene styrene polymers, polyvinyl acetate polymers, polyvinyl chloride polymers, polyvinylidene chloride polymers, and urethane polymers.

5. A composition according to claim 1, wherein said film-forming material is an acrylic polymer.

6. A composition according to claim 1, wherein said film-forming material is a butadiene-styrene polymer.

7. A composition according to claim 1, wherein said film-forming material is a polyvinyl acetate polymer.

8. A composition according to claim 1, wherein said film-forming material is a polyvinyl chloride polymer.

9. A composition according to claim 1, wherein said film-forming material is a polyvinylidene chloride polymer.

* * * * *